Jan. 20, 1970 L. R. HARROLD 3,491,355
AUTOMATIC DATA SEQUENCER
Filed Jan. 24, 1966 2 Sheets-Sheet 1

INVENTOR.
LOUIS R. HARROLD
BY
ATTORNEYS

INVENTOR.
LOUIS R. HARROLD
BY [signature]
[signature]
ATTORNEYS

United States Patent Office 3,491,355

Patented Jan. 20, 1970

3,491,355
AUTOMATIC DATA SEQUENCER

Louis R. Harrold, San Diego, Calif., assignor to the United States of America as represented by the Secretary of the Navy Filed Jan. 24, 1966, Ser. No. 522,792
Int. Cl. G08b *1/00*; H04l *15/04, 17/02*
U.S. Cl. 340—365 5 Claims

ABSTRACT OF THE DISCLOSURE

An apparatus for entering and transmitting data comprising at least two distinguishable groups of selectable data is arranged and connected to operate in predetermined group sequence. An enabling means is included in each group of data entry means and is responsive to a predetermined condition for enabling the entry of data into the next successively operative group of data entry means. A further enabling means is operatively responsive to a predetermined condition of data entry into the last successively operative discrete group of data entry means for enabling a data transmission control element and a means responsive to external actuation of the transmitting control element is operative for automatically fulfilling any predetermined conditions of data entry into the last successively operative group of data entry means for enabling the data transmission control element.

STATEMENT OF GOVERNMENT INTEREST

The invention described herein may be manufactured and used by or for the Government of the United States of America for governmental purposes without the payment of any royalties thereon or therefor.

The present invention is concerned with an apparatus for entering and transmitting data and more particularly with such an apparatus wherein one or more groups of selectable data entry means are arranged and connected to operate in predetermined group sequence.

In order to enter data into data storage, data processing or computer means, for example, digital data entering and transmitting means known as keysets are conventionally employed. Such keysets may be manually actuatable by depressing keys selected from a plurality of keys disposed and identified in predetermined groups. In such keysets it is not uncommon for the groups of keys representing different kinds of data to be arranged so that they operate only in predetermined group sequence.

Accordingly, a first group of such data entry means is required to be fully actuated before a successive group will become enabled to accept data. Similarly, second, third and successive groups of such data entry means will not be successively enabled until the prior group has been actuated by completing the entry of a particular number of increments of data or a similarly predetermined condition.

Such keyset data entry and transmission apparatus may typically be arranged so that the data entered into the apparatus may not be transmitted to a data storage, data processing or computer means until the operative requirements pre-established for each group sequence of data entry means have been fully completed in order to enable a data transmission control element. The data control transmit element may conventionally be arranged to cause all data previously entered into the keyset to be transmitted to a data storage, data processing or computer means or such other equipment, which in turn is arranged and connected to receive the data. Additionally, such data transmission control element is also operative upon its actuation to cause the clearing of the keyset so that it is in a state to receive the entry of new data.

Those skilled in the art will appreciate that in conventional keysets which operate upon principles substantially as described above, groups of data entry means usually have a plurality of data entry keys, each of which is representative of a particular category of digital, word, or message data. A group of data entry means may comprise a plurality of six manually actuatable keys, for example, but it is not uncommon for data which is entered into the apparatus by depressing a selected number of such group of keys to be complete in certain instances by employing two, three or four of the keys rather than the entire number of six keys. In other words, some data may require the entry of six digits, for instance, while other data may be fully complete by entry of two digits. Prior art keysets, of the type described above, conventionally operate so that a group of data entry means having a plurality of keys, for example, for representing different increments of data will not enable the next sequentially operable group of data entry means until each and every one of the plurality of incremental data elements have been actuated by one or more selected keys in its category. For instance, if the data entry means comprises six digits, the plurality of keys will likely number ten keys, there being a zero, one, two, three, four, five, six, seven, eight and nine key which is selectable for each of the six digital increments. Thus, if a data entry is complete upon the depression of only three such keys selected to represent digital increments, prior art keysets were arranged to operate so that the zero key be depressed three additional times to complete the full six increments of digital information before the next sequential operation is enabled.

The present invention has conceived an arrangement and system which automatically completes the requisite data entry, thereby fulfilling the condition necessary to enable each successive group of data entry means in the event that data entered into the apparatus does not require actuation of each digital or word increment necessary to enable the next successively actuatable group of data entry means.

A fundamental and primary object of the present invention is to obviate the requirement of prior art systems for the entry and transmission of data which necessitated the manual actuation of a predetermined number of data increments before successive groups of data entry means were enabled to accept data.

It is another object of the present invention to provide an apparatus for entering and transmitting data wherein predetermined conditions of data entry into successively operative groups of data entry means may be automatically fulfilled for enabling each successively operative group of such data entry means.

An equally important object of the present invention is to provide such an apparatus for entering and transmitting data and including means responsive to external actuation of a transmitting control element for automatically fulfilling predetermined conditions of data entry.

A further object of the present invention is to provide such an apparatus wherein the predetermined conditions of data entry are automatically fulfilled by generating a signal representative of a cipher for each unactuated data entry means.

Still a further object of the present invention is to provide such an apparatus wherein an electrical signal is generated to fulfill predetermined requirements of the sequentially enabled groups of discrete data entries.

In its preferred embodiment the present invention may comprise an apparatus for entering and transmitting data having at least two groups of selectable data entry means which are arranged and connected to operate in predetermined group sequence; an enabling means is included in each of such groups of data entry means and is responsive to a predetermined condition of the apparatus for enabling the entry of data into the next successively operative group of data entry means. The last of the successively operative groups of data entry means includes an enabling means which is operatively responsive to a fulfilled predetermined condition for enabling a data transmission control element. Upon external actuation of the transmitting control element, means within the apparatus is responsive for automatically fulfilling the predetermined condition of data entry into the last successively operative group of data entry means for enabling the data transmission control element.

Thus the present invention is conceived to facilitate the quick and accurate entry of data by the inclusion of means to automatically fulfill predetermined data entry conditions and inherently has the additional advantage of obviating much of the possibility of human error in the course of manually fulfilling such predetermined data entry conditions as was required in the prior art.

These and other objects, advantages and features of the present invention will be more fully understood from the following description of an embodiment of the invention together with the drawings illustrating that embodiment and the scope of the invention will be pointed out in the appended claims.

Figure 1:
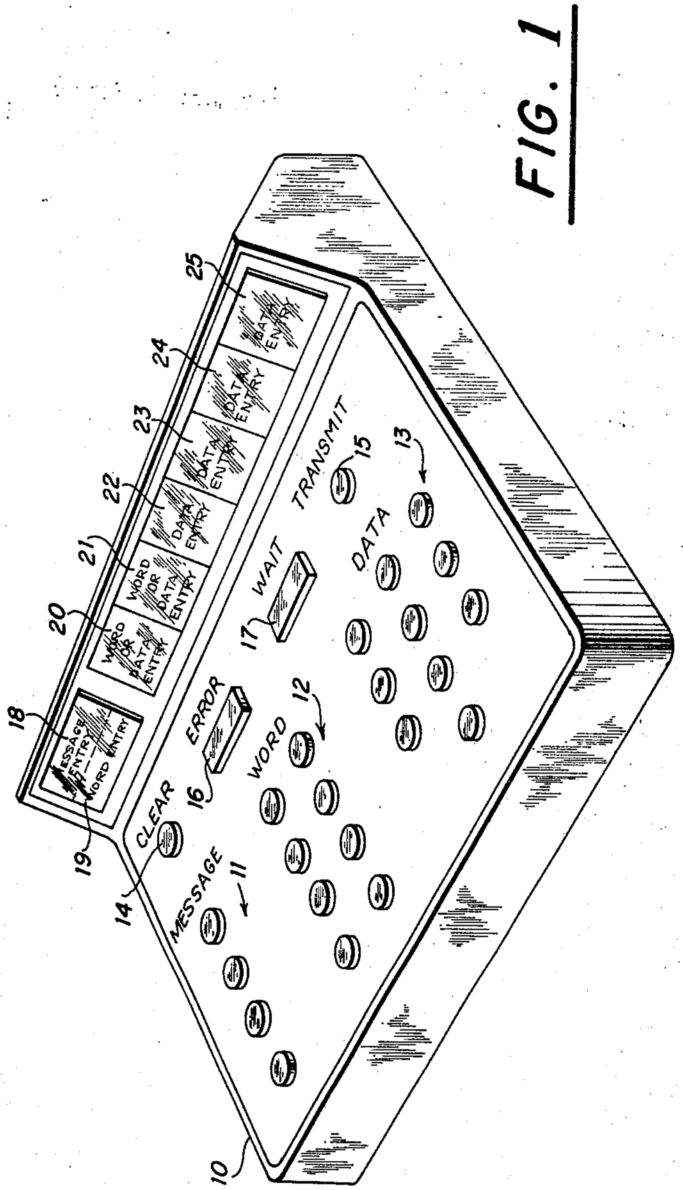
FIG. 1 is an illustration of a typical keyboard layout of a data entry means which may be employed with the present invention.

FIG. 1 illustrates a typical keyboard, keyset, and display arrangement which is employed to enter data for data storage, data processing or computation purposes. The arrangement 10 shows a group of four message keys 11, a second grouping of eight word keys 12, and a third grouping of ten digital keys 13. On the upper portion of the keyboard a CLEAR key is shown at 14 and a TRANSMIT key is shown at 15. Also on the upper portion of the keyboard, two windows providing visual indication are included for indicating ERROR at 16 and WAIT instructions at 17.

Abve the keyboard a vosual display array is shown. On the left hand side of the visual display, provision is made for MESSAGE entry indication at 18 and a WORD entry indication at 19. To the right of those visual indicators there are six adjacent visual indicators, the first two of which at 20 and 21 may indicate WORD or DATA entry while the remaining four adjacent visual indicators 22, 23, 24 and 25 will indicate a DATA entry, usually in digital form.

A keyset as illustrated in FIG. 1 is employed to enter and transmit data into a data storage, data processing or computation means. In typical operation of the conventional prior art keyset, the following sequence of operations was required. Firstly, the CLEAR key was depressed to clear all data from the apparatus. Secondly, one of the plurality of MESSAGE keys 11 was selected and depressed. A visual indication commensurate with the selected MESSAGE key then appeared in the MESSAGE entry indicator 18 on the upper portion of the visual display. Thirdly, a WORD key was selected and depressed and a visual confirmation was indicated in the WORD entry 19 in the visual display portion of the keyset, display, and keyboard. Fourthly, starting with the highest order digit, six digits, including zeros when necessary, are entered into the keyset by depressing selected keys of the digital DATA group 13, which entry will be confirmed by the appearance of the commensurate digit sequentially in the visual DATA entry indicators 20 through 25 on the upper portion of the visual display. As indicated by the visual display indicators 20 and 21 on some keysets, the first two digits may be selected by code names.

In any event, if data are not available or not required for a given digit, the zero key must be depressed. This implicity requires that the entry of data which only comprises two, three, four or five digits must be filled out by the entry of additional zeros in order to complete the predetermined condition before the TRANSMIT key will be enabled. When the entry of six increments of digital data has been completed, the key set is responsive to enable the transmit control element. The last step, therefore, is to depress the TRANSMIT key, which signals to the associated apparatus that the data entered into the keyset are now ready for transmission. When such data has been accepted by the associated equipment, the keyset is ready to be cleared for the entry of new or different data.

The present invention may include a keyboard, keyset and visual display means substantially as illustrated in FIG. 1 but which operates in a different and improved manner. The mode of operation of the present invention is such that, as a first step a message may be selected from the plurality of possible MESSAGES offered by the array of keys 11 and actuated. The selected MESSAGE is then confirmed by a visual indication at the indicator 18. As the second step, a word may be selected from the plurality of WORD keys 12, which selection is confirmed in the WORD entry visual indicator 19; at this point digital data may be selected and entered into the key set by depression of one or more of the DATA keys 13 or alternatively the TRANSMIT key may be depressed which will automatically fill all of the digital data entries with ciphers so as to complete the predetermined requirement for enabling the transmit portion of the apparatus.

By contrast in the prior art operation, the zero key of the DATA keys 13 would have to be depressed six successive times before the TRANSMIT key would become operative to permit transmission of the data entries to the associated equipment.

The present invention is not limited to fulfilling only the data requirements of the last of several groups of data entries, but operates to fulfill all subsequent requirements. For instance, in the above described sequence of operations, the TRANSMIT key may be actuated immediately following the selection and actuation of a MESSAGE key and all the required WORD and DATA entries will be automatically fulfilled.

As a typical example, the data that is entered into the keyset may comprise the selection and actuation of one of the group of MESSAGE keys 11, one of the group of WORD keys 12 and the entry of a compass bearing, for instance, consisting of three digits. In this example, the TRANSMIT key would then be depressed which would automatically fill out the group of digital data entries with three zeros to complete the required digital data entry.

In the operation of the apparatus illustrated in FIG. 1, typically, the MESSAGE, WORD AND DATA entries must be made in a fixed and predetermined sequence. When the DATA key group has been enabled, the zeros may be entered into the DATA windows by depressing the zero DATA key each time a zero is required. The zero DATA key is so connected to logic circuitry that, essentially, each time it is depressed it will complete a ground return path for a voltage through relay coils, for instance, arranged and connected in accordance with a predetermined logic operation; the resultant signal developed is an excursion between 26 volts and 0 volt and back aagin to −26 volts in accordance with the number of times that the DATA key is depressed. Conventionally such a signal, therefore, may comprise a substantially square waveform of output between two potentials such as 0 volt and −26 volts, for instance.

In accordance with the concept of the present invention, a plurality of equivalent zero signals may be generated by developing a substantially square wave signal having an excursion between two potentials as described previously.

Figure 2:
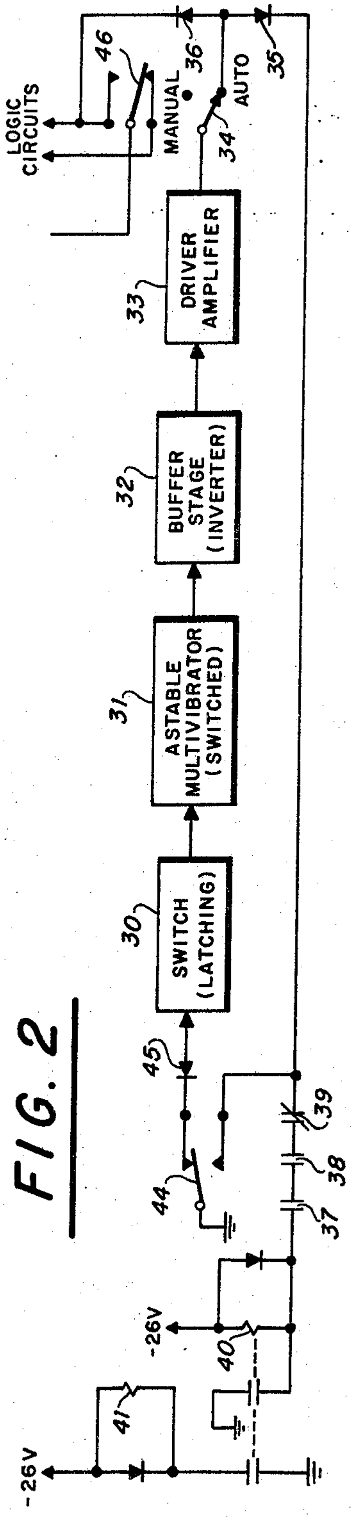
FIG. 2 is a schematic block diagram of the principal elements of apparatus included in an embodiment of the present invention.

FIG. 2 illustrates, by means of a schematic block diagram, the basic elements of an embodiment of the present invention. These elements are shown as comprising an electronic switch 30, an astable multivibrator 31, a buffer stage and inverter 32 and a driver amplifier 33 which are serially connected. A selectively positionable switch 34 is provided so that either automatic or manual operation of the keyset may be chosen as desired.

The switch 34, when positioned in the "automatic" position, of the embodiment of FIG. 2, causes the apparatus to automatically fulfill the predetermined data entry requirements of a keyset in the following manner of operation. Depressing a MESSAGE key such as the key 11, enables the switch 30 and actuation of the TRANSMIT key 44 turns on the astable multivibrator 31 through the switch latching circuitry 30. The multivibrator 31 provides a substantially square wave output which is buffered through an inverter 32 to driver amplifier 33, the output of which varies in square wave fashion from —26 volts to 0 volt over a time period that is determined by the frequency of the multivibrator 31.

The square wave output of the driver amplifier 33 is gated to keyset logic circuitry through the diodes 35 and 36 and each excursion from the quiescent value of —26 volts to 0 volt will represent a zero DATA key actuation as described hereinbefore. Therefore, if six DATA windows are required to be filled in order to enable the next sequential operation, at least six excursions from —26 volts to 0 volt are necessary to fill such DATA windows and complete the required DATA entries to enable further operation in the next sequence of the apparatus. After all DATA windows have been so filled, the logic circuitry of the keyset is so arranged to energize and close relays 37 and 38 as indicated in the schematic block diagram of FIG. 2. Relay 39 in series with relays 37 and 38 is normally closed. Accordingly, the next following excursion of the output from driver amplifier 33 energizes the relays 40 and 41.

In accordance with the logic circuitry of the keyset, the energization of relay 41 sends an ENTER signal to keyset central, which is the connecting point to the associated equipment, at the same time the latching switch 30 is disabled. Unlatching of the switch 30 then shuts off the astable multivibrator 31 and the output of the driver amplifier 33 returns to its quiescent state of —26 volts. This cycle of events repeats for every new set of data to be entered into the keyset when the keyset is in its automatic mode of operation as determined by positioning the switch 34.

Figure 3:
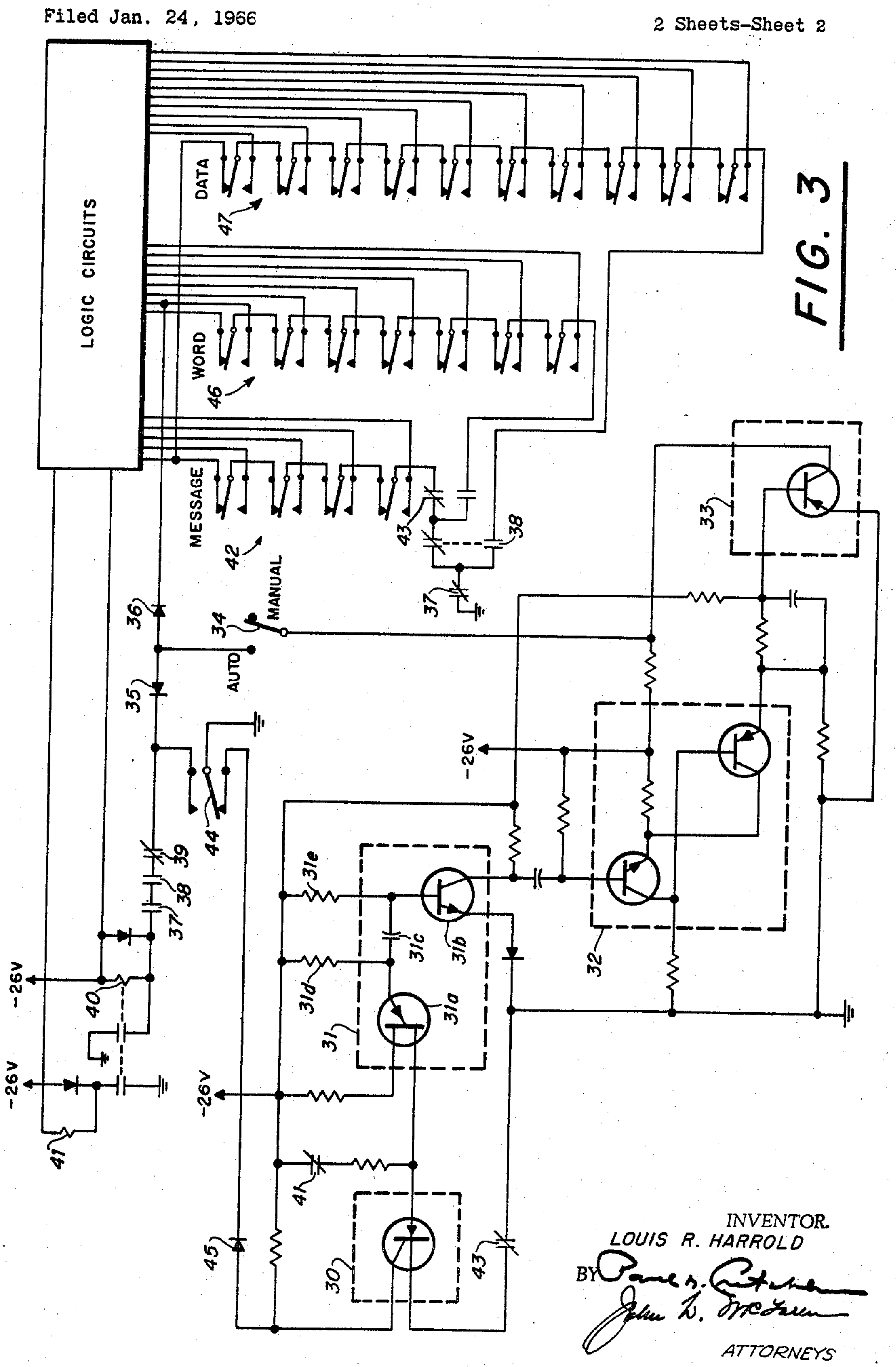
FIG. 3 is a schematic wiring diagram of an embodiment of the automatically operable portion of the present invention illustrating its connection to a typical data entry and transmission means.

FIG. 3 illustrates a more detailed wiring schematic diagram of the embodiment of the present invention as shown in the block diagram of FIG. 2. In the description of the operation of the embodiment illustrated in FIG. 3, it will be assumed that the keyset apparatus has been cleared, that the switch 34 is in the "automatic" position and that the apparatus is in condition to accept the entry of new data. In this quiescent state the multivibrator 31 is not oscillating and the output of the driver amplifier 33 is a constant, quiescent —26 volts.

Upon the actuation of one of the group of MESSAGE keys 42, the relay 43 is energized, closing its contacts including those in the cathode circuit of the silicon controlled rectifier switch 30. Assuming that no WORD keys 46 or DATA keys 47 are depressed, but that the TRANSMIT key 44 is actuated, the ground lead at the cathode of diode 45 will be opened. A high positive potential will now be realized at the gate lead of the silicon controlled rectifier switch 30 and sufficient gate current will be coupled through the circuit, including the normally closed relay 41, so as to turn on the silicon controlled rectifier switch 30. When the TRANSMIT key 44 is released, the gate lead through diode 45 returns to substantially 0 volt or ground potential and has no further effect on the conducting silicon controlled rectifier switch 30.

Conduction through the silicon controlled rectifier switch 30 virtually grounds the base lead of the transistor 31*a* which then starts the astable multivibrator comprised of the transistors 31*a* and 31*b*, causing its oscillation. The period of oscillation determines the character of the square wave output and is controlled by the combination of the capacitor 31*c* together with the values of the resistors 31*d* and 31*e*. The output of the multivibrator 31 is connected through a coupling capacitor to the inverter buffer stage 32 and the driver amplifier 33. The output of the driver amplifier 33 varies between —26 volts and 0 volt and gates the diodes 35 and 36 when the switch 34 is in the "automatic" position. If the switch is in the manual position, the circuit has no effect on the normal operation of the keyset in the manner of prior art apparatus.

The keyset is so arranged in accordance with the appropriate keyset logic circuitry that the zero bit connection is essentially set to ground through diode 36 when the output voltage of the driver amplifier 33 goes positive to 0 volt or ground potential. As soon as all incremental data requirements of the MESSAGE keys 42, the WORD keys 46, and the DATA keys 47 are fulfilled, the relays 37 and 38 are set. Accordingly, the next positive excursion from the output amplifier 34 sets the relay 40 through the diode 35. Relay 40, in turn, latches on the relay 41 sending an ENTER signal to the keyset central which is the point of connection with the associated equipment and also opening the contacts in the anode circuit of the silicon controlled rectifier switch 30. This operation turns the silicon controlled rectifier switch 30 off, thereby causing cessation of the operation and oscillation of the multivibrator 31. As soon as the keyset apparatus has been cleared, new data entries may be made and the sequence of events as described above will be repeated.

Thus it may be seen that the present invention is arranged to automatically fulfill predetermined incremental data requirements of data entry means which are arranged and connected to operate in a predetermined group sequence and that its operation is so conceived and designed as to enable a data transmission control element for indicating to an associated apparatus that the data is ready to be transmitted to the appropriate data storage data processing or computer means as the typical case may be.

Moreover, the present invention is such that, it greatly increases the speed with which data may be entered by speedily and automatically fulfilling predetermined data entry requirements. Such enhancement of the speed of operation of a typical data entry apparatus, which may take the form of a keyset, is accompanied by an equally important advantage that the automated fulfillment of predetermined incremental or discrete data requirements obviates much of the possibility of human error, such as striking a wrong key for instance, by completing such fulfillments automatically with ciphers generated by an appropriate circuit arrangement.

The present invention has been described in a typical embodiment which may take a form including relays and manually actuable switches arranged and connected to operate together with appropriately designed logic circuitry. It is to be understood, however, that the concepts of the present invention may be equally as well applicable to data entry apparatus having forms of logic circuitry including other than relays and electrical switches.

What is claimed is:

1. An apparatus for entering and transmitting data comprising;

a first plurality of manually operative means, each arranged and connected to represent a selectable type of data message upon actuation;

said first plurality of means including first commonly operative means responsive to the selective actuation of one of the types of data message for disabling the remainder of said first plurality and to enable a second plurality of selectable means;

a second plurality of manually operative means, each arranged and connected to represent a selectable data word upon actuation, said second plurality of means being responsive to said enabling actuation by said first plurality of means and including second commonly operative means responsive to the selective actuation of one of said data words for disabling the remainder of said second plurality and enabling a multiple digital input means;

a multiple selectable digital input means responsive to said enabling actuation by said second plurality of means, and operative to enable data transmission control means upon selectable actuation of a predetermined number of said selectable digital input means;

data transmission control means responsive to the enabling actuation of said predetermined number of said selectable digital input means for transmitting the entire composite data entered in said several aforesaid means, and means responsive to external actuation of said data transmission control means for automatically completing the actuation of said predetermined number of said selectable digital input means for enabling said data transmission control means.

2. An apparatus for entering and transmitting data as claimed in claim 1 wherein data entry means are responsive to generate electrical signals representative of said data.

3. An apparatus for entering and transmitting data as claimed in claim 2 wherein said electrical signals comprise a predetermined change in electrical potential.

4. An apparatus for entering and transmitting data as claimed in claim 3 wherein said means responsive to external actuation of said transmission control means is operative to automatically generate substantially square wave signals comprising said predetermined change in electrical potential.

5. An apparatus for entering and transmitting data as claimed in claim 4 wherein said means operative to automatically generate a substantially square wave signal is responsive to fulfill actuating said predetermined number of said selectable digital input means by providing an electrical input signal representative of the absence of digital quantity.

References Cited

UNITED STATES PATENTS

| | | | |
|---|---|---|---|
| 2,504,999 | 4/1950 | McWhirter et al. | 340—346 |
| 3,154,640 | 10/1964 | Schierhorst | 178—79 |
| 3,187,321 | 6/1965 | Kameny | 340—365 |
| 3,361,875 | 1/1968 | Banfalvi et al. | 178—79 |

THOMAS A. ROBINSON, Primary Examiner

U.S. Cl. X.R.

178—79